United States Patent
Lauris

(10) Patent No.: US 6,810,516 B2
(45) Date of Patent: Oct. 26, 2004

(54) MECHANISM ALLOWING SEPARATION OF GRAPHICAL DISPLAY OF OBJECT STATUS FROM UNDERLYING DATA

(75) Inventor: Inna Lauris, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 09/984,361

(22) Filed: Oct. 30, 2001

(65) Prior Publication Data

US 2003/0095143 A1 May 22, 2003

(51) Int. Cl.[7] .................................................. G06F 9/44
(52) U.S. Cl. ...................... 717/105; 717/125; 717/108; 717/116; 717/109; 707/3; 707/5; 345/594; 345/650
(58) Field of Search ................................ 717/105, 108, 717/109, 116; 707/3, 5; 345/594, 650

(56) References Cited

U.S. PATENT DOCUMENTS

| | | | | |
|---|---|---|---|---|
| 5,901,315 A | * | 5/1999 | Edwards et al. | 717/124 |
| 5,926,817 A | * | 7/1999 | Christeson et al. | 707/10 |
| 6,038,395 A | * | 3/2000 | Chow et al. | 717/105 |
| 6,253,368 B1 | * | 6/2001 | Nelin et al. | 717/124 |
| 6,412,106 B1 | * | 6/2002 | Leask et al. | 717/124 |
| 6,425,120 B1 | * | 7/2002 | Morganelli et al. | 717/109 |
| 6,684,385 B1 | * | 1/2004 | Bailey et al. | 717/109 |
| 6,738,964 B1 | * | 5/2004 | Zink et al. | 717/105 |
| 6,757,670 B1 | * | 6/2004 | Inohara et al. | 707/3 |
| 6,763,515 B1 | * | 7/2004 | Vazquez et al. | 717/109 |

OTHER PUBLICATIONS

Title: A Visual Development Environment for GUI Systems, author: Ostrand et al, ACM, 1998.*
Title: Automatic Generation of Graphical User Interfaces for Interactive Database Applications, author: Pizano, ACM, 1993.*
Bumpus, Winston, "Network Management and Administration", Distributed Management Task Force, Inc., p. p. 1–30, Apr. 3, 2001.
"Concepts and Terminology Important to Understanding WMI and CIM", www.eu.microsoft.com/hwdev/manageability/wmi–cim.htm, p. p. 1–9, Apr. 23, 1999.

* cited by examiner

Primary Examiner—Chameli C. Das

(57) ABSTRACT

A system that isolates all of the information that determines the look and feel of status displays of a GUI into one file is described. This file can be quickly edited to change the appearance when needed. In one embodiment, a user requests that an object border should be yellow instead of green for a particular situation. This modification is achieved without code recompilation, by editing a few lines in a file. Similarly, if another visual indicator needs to be added, file editing is all that is required. The application source code utilizes a class schema which defines the visual components of the GUI that should be modifiable file. A modifiable file comprising class instances corresponding to the class schema is read in and processed when the application is launched. Further changes require the application to be restarted to read in the modified file.

16 Claims, 4 Drawing Sheets

MECHANISM ALLOWING SEPARATION OF GRAPHICAL DISPLAY OF OBJECT STATUS FROM UNDERLYING DATA

CROSS REFERENCE TO RELATED APPLICATIONS

This application is related to U.S. patent application Ser. No. 09/984,371 (Docket No.: HP 10016745) to J. Patrizio and E. Soderberg, entitled "SYSTEM AND METHOD FOR DISPLAYING A LAYOUT OF GUI PROPERTIES PANEL", and U.S. patent application Ser. No. 09/984,368 (Docket No. HP 10018664) to Jonathan Patrizio and Eric Soderberg, entitled "SYSTEM AND METHOD FOR TABLE ROW SELECTION IN A GUI DISPLAY", both applications filed concurrently and assigned to a common assignee, and herein incorporated by reference in their entirety.

COPYRIGHT NOTICE

A portion of the disclosure of this patent document contains material which is subject to copyright protection. The copyright owner has no objection to the facsimile reproduction by anyone of this patent document or the patent disclosure, as it appears in the Patent and Trademark Office patent file or records, but otherwise reserves all copyright rights whatsoever.

TECHNICAL FIELD

The technical field relates to a graphical display of data, and more particularly to a mechanism which allows separation of graphical display of object status from underlying data. The data is stored in managed object format (MOF) files and defines visual indicators to be displayed.

BACKGROUND

The Data Management Task Force (DTMF) developed the Common Information Model (CIM) in 1996 to provide a common way to share management information enterprise wide. The CIM schema provides models for various implementations to describe management data in a standard format. A number of graphic user interface (GUI) applications have been developed and deployed which take advantage of the CIM architecture.

According to a presentation by Winston Bumpus of the DTMF presented at the DTMF *Comdex Management Presentation*, Apr. 3, 2001, entitled, "Network Management and Administration", best of breed applications are used to manage network and system infrastructure. Different applications gather different pieces of data about the same resource. It is difficult to aggregate data from disparate management applications for: service level measurement; true "end-to-end" view of a network; fault diagnosis; capacity planning; and resource usage billing. It is currently a very manual process (human intensive), inaccurate, slow and cumbersome. Thus a number of products have been developed, and are currently evolving to solve these problems.

The multi-computer/serviceguard (mc/serviceguard) (hereafter, "ServiceGuard Manager") product, available from Hewlett-Packard Company, is a specialized facility for protecting mission-critical applications from a wide variety of hardware and software failures. With this system, multiple (up to 16-nodes) systems are organized into an enterprise cluster that delivers highly available application services to local area network (LAN) attached clients. ServiceGuard Manager monitors the health of each node and quickly responds to failures in a way that minimizes or eliminates application downtime. Status and information gathered about the network is presented to the user (network administrator) via a GUI.

The look and feel of a graphical user interface (GUI) is very subjective. User feedback is therefore essential for a GUI to be successful. It is advantageous to have a method for changing display appearance based on client/user feedback.

Graphical status displays used in the prior art GUIs determine status and corresponding visual indicators in logic that is encapsulated in source code. Thus, to change a visual indicator, or add/delete visual indicators, the developer is required to modify the source code and recompile the application code. Integrating feedback from users into the graphical display application is not easily done with prototyping because of the recoding and recompilation necessary. Moreover, each time source code is modified and recompiled, the risk of introducing new bugs (errors) into the GUI is increased.

The integration of user feedback into the GUI application is an iterative process. Each time the GUI is updated and recompiled, the user is given another chance to provide comments. This can go on ad infinitum until the GUI is deemed satisfactory for its designated purpose. Thus, shortening each cycle of the feedback integration process can improve the overall quality and timeliness of the GUI application.

SUMMARY

It is an aspect of the present invention to reduce turn-around time to implement desired changes in a graphical display.

It is yet another aspect to provide a method for customizing the display characteristics of a graphic user interface (GUI) for various users.

These and other aspects and embodiments of the present invention are achieved in a system that isolates all of the information that determines the look and feel of status displays of a GUI into one file. This file can be quickly edited to change the appearance when needed. For example, in one embodiment, a user requests that an object border should be yellow instead of green for a particular situation. This modification is achieved without code recompilation, by editing a few lines in a file. Similarly, if another visual indicator needs to be added, file editing is all that is required. The application source code utilizes a class schema and the modifiable file is read in and processed when the application is launched. Further changes require the application to be restarted to read in the modified file.

According to one embodiment of the invention, a class schema is identified which defines the visual components of the GUI that should be modifiable. The class schema and the corresponding class instances are defined in managed object format (MOF) files. MOF files follow a standard format that is well known to those skilled in the art. It will be apparent to one skilled in the art that as the CIM technology evolves, other formats might be used.

The MOF file contains four types of entries: (1) a primary query entry, which is the first query to run for a given object; (2) an entry connecting the outcome of the primary query with a visual indicator, if any; (3) one or more entries connecting outcome of a primary entry with "secondary" queries; and (4) an entry connecting each of possible secondary query entries with a visual indicator.

DESCRIPTION OF DRAWINGS

The invention will be described in detail in the following description of preferred embodiments with reference to the following figures wherein.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In the present invention, a system is defined that isolates all of the information that determines the look and feel of status displays of a GUI into one file. In one embodiment the present invention is integrated with the ServiceGuard clustering solution product, available from Hewlett-Packard Company. ServiceGuard uses a GUI which consists of a tree and a map panel.

Figure 1:
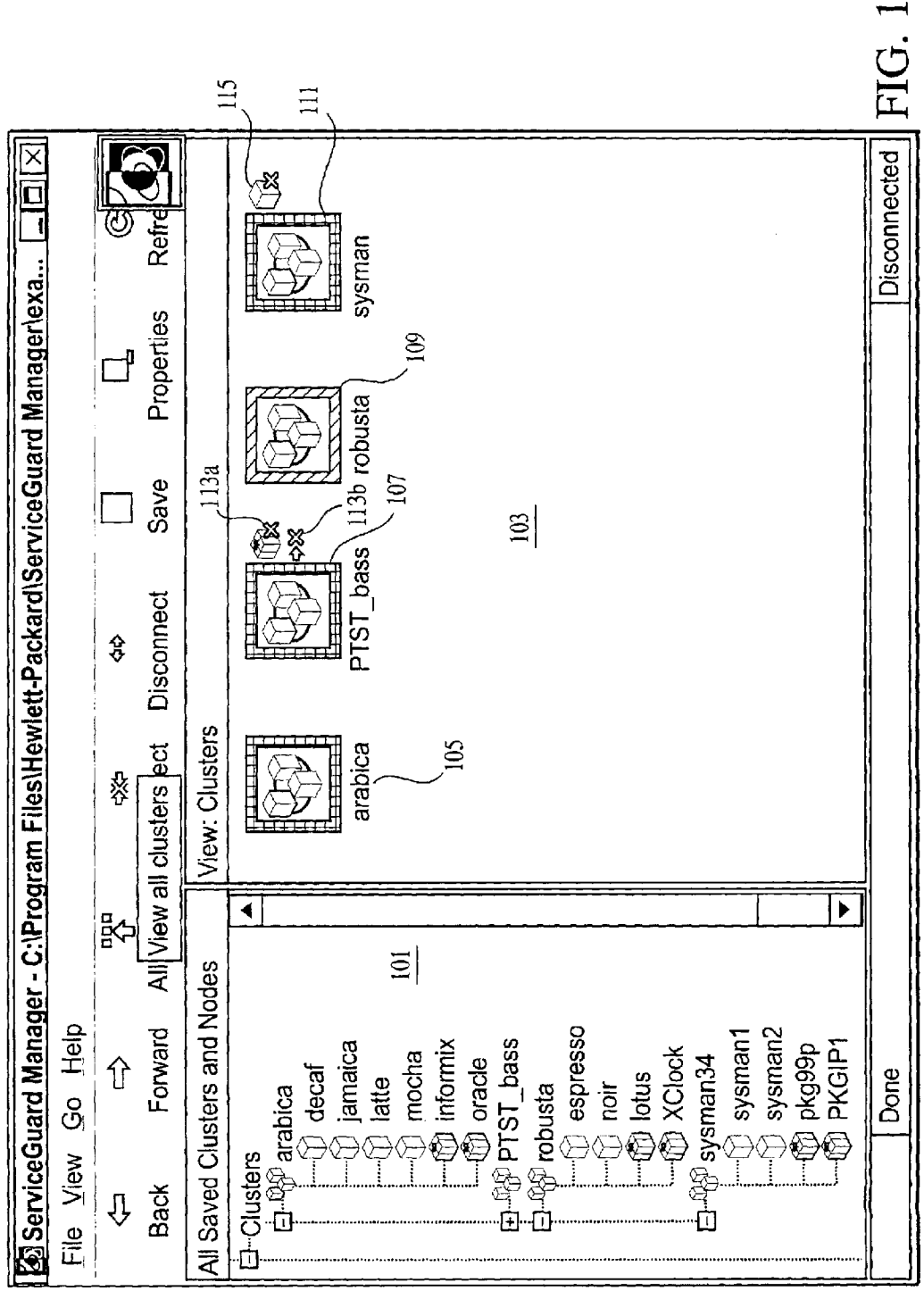
FIG. 1 is a screen shot of an exemplary top level screen shot of a ServiceGuard product.

Referring now to the drawings, and in particular to FIG. 1, there is shown an exemplary top level screen shot of the ServiceGuard product having left 101 and right 103 panels. The left panel 101 shows a tree of clusters, nodes and packages monitored by the ServiceGuard clustering product. The right panel 103 shows a map of these objects (clusters, nodes and packages) and how they are interrelated. The map panel 103 view shows user selectable levels of the clusters, nodes and packages in the monitored system. For instance, FIG. 1 shows all networked and monitored clusters: arabica 105, PTST_bass 107, robusta 109, and sysman 111.

Figure 2:
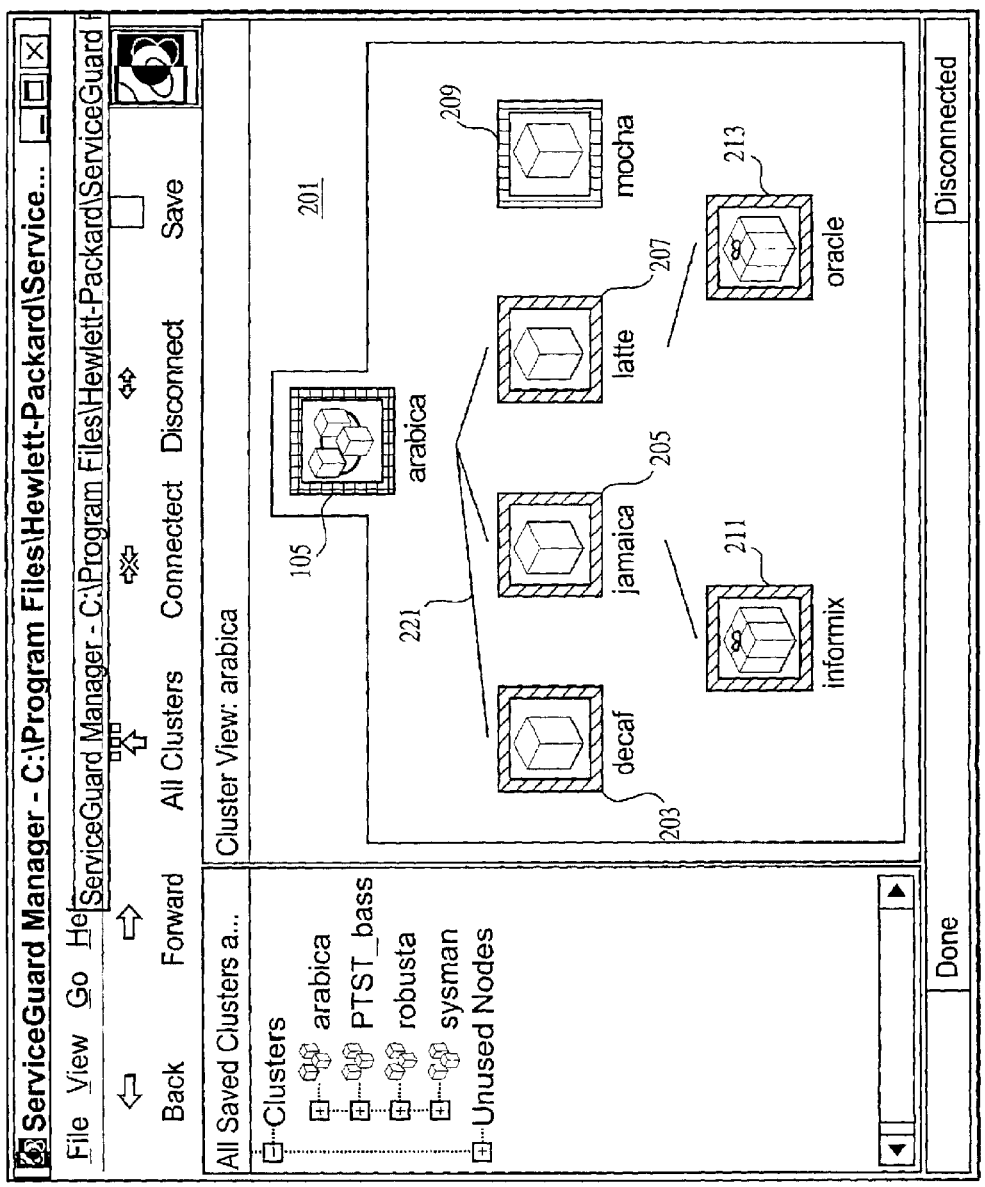
FIG. 2 is a screen shot of a map with focus on a cluster.

FIG. 2 shows a map 201 with the focus on the configuration of the cluster arabica 105. In this exemplary view, arabica 105 has four (4) nodes: decaf 203, jamaica 205, latte 207, and mocha 209. There are two (2) packages associated with this cluster: informix 211 and oracle 213. The nodes decaf, jamaica, and latte are connected to the cluster as shown by the lines 221. The node, mocha 209, however, is not connected to the cluster. There are a number of modifiable visual indicators shown here. For example, each object has a border. The border indicates the top level status of the object (up, down, or other). For instance, the border of arabica 105 is yellow, as indicated by a vertical and horizontal cross hatch pattern. This indicates that the cluster is functional, but that all nodes or packages may not be operating. The borders of nodes decaf 203, jamaica 205 and latte 207 are, on the other hand, green, as indicated by a diagonal line pattern. The green border indicates that all conditions are normal for these nodes. Finally, the border of the mocha node 209 is red, as indicated by a vertical line pattern. The red border indicates that the node is down.

Figure 3:
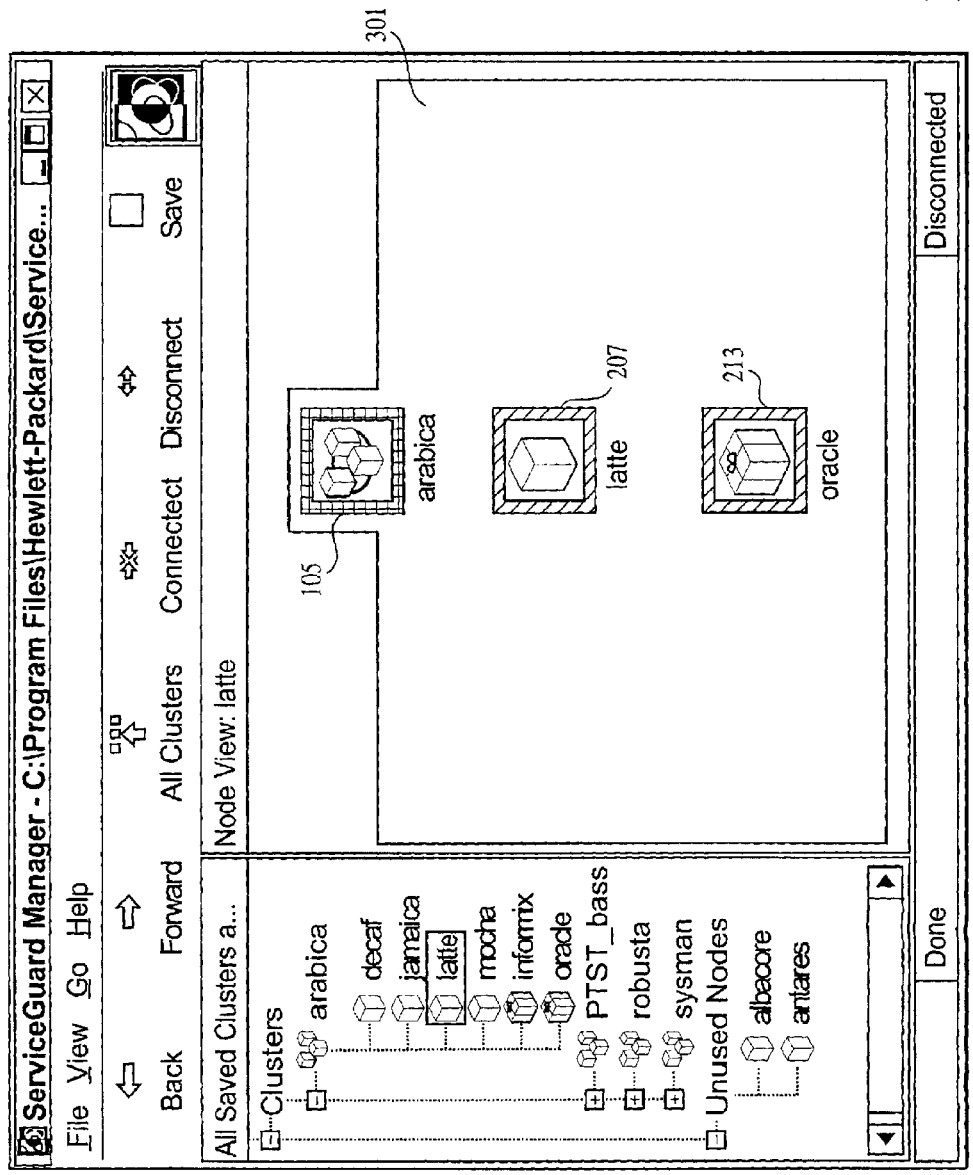
FIG. 3 is a screen shot of a map with focus on a node.

Referring now to FIG. 3, there is shown a screen shot of a map 301 with a focus on the node latte 207, as illustrated in FIG. 2. As indicated in both figures, the borders of the node latte 207 and the package 213 are green to indicate normal operations. The cluster arabica 105 has a red border, as before, to indicate that at least one subordinate node or package is operating at a sub-optimal level. Because this particular view is a node view of latte 207, the node or package causing arabica 105 to be red, i.e., the node mocha 209, is not visible on this map.

Referring again to FIG. 1, there are shown additional non-color visual indicators 113 and 115 for clusters PTST_bass 107 and sysman 111, respectively. In particular, there are two icons shown for PTST_bass, top 113a and bottom 113b icons. The top icon 113a, illustrated by an "X" mark over the package box icon, indicates that at least one of the cluster's packages is down. The bottom icon 113b, illustrated by an arrow pointing to an "X" mark, indicates that at least one of the packages has lost high availability. The package is running, but has no failover node. A single point of failure exists. If the package fails on this node, it will go down. The icon 115 for sysman 111 also indicates that at least one of the cluster's packages is down.

It will be apparent to one skilled in the art that visual indicators other than color or the specific icons used in ServiceGuard may be implemented. For instance, an object's border might be shaded or displayed with a different pattern of hash marks rather than color coded. The actual visual indicators are not relevant to the invention except as relates to user preferences and ease of display.

As the monitored system becomes more complex, the user/network administrator may prefer to view various status indicators differently. For instance, some users may wish to eliminate yellow borders and only see red or green. There may be more than three levels of readiness, requiring additional colors, etc. Therefore, the present invention defines a method and system which allows separation of graphical display of object status from underlying data. The data is preferably stored in managed object format (MOF) files and defines visual indicators for display.

The application source code preferably utilizes a class schema and the modifiable file is read in and processed when the application is launched. Further changes require the application to be restarted to read in the modified file.

According to one embodiment of the invention, a class schema is identified which defines the visual components of the GUI that should be modifiable. The class schema and the corresponding class instances in this embodiment are defined in managed object format (MOF) files. MOF files follow a standard format that is well known to those skilled in the art. It will be apparent to one skilled in the art that as the CIM technology evolves, other formats might be used.

In the exemplary schema, the MOF file contains four types of entries: (1) a primary query entry, which is the first query to run for a given object; (2) an entry connecting the outcome of the primary query with a visual indicator, if any; (3) one or more entries connecting outcome of a primary entry with "secondary" queries; and (4) an entry connecting each of possible secondary query entries with a visual indicator. An exemplary class schema (Copyright 2001 to Hewlett-Packard Company) follows:

```
class MapStatusQueryTypes {
    // map class id
    CMObjectClass ref mapClassId;
    // type of a query
    string type;
    // priority of a query
    int32 priority;
}
class MapStatusQuery {
    // query id
```

```
                string id;
                    // class id
                CMObjectClass ref mapClassId;
                    // query string
                string query;
                    // priority of a secondary query which determines
                    // an order in which this query is ran
                int32 priority;
                    // type of the query, corresponds to
                    // MapStatusQueryTypes.type
                string type;
                    // determines whether the query is to be ran locally
                    // or over the connection
                boolean local;
                boolean emptyValue;
                string compatibilityRequirement;
        }
        class MapClassDecoration {//abstract
        }
        class MapBadgeIcon: MapClassDecoration {
                // badge id
                string id;
                    // gif file for this badge
                string iconFile;
                    // badge tooltip
                string toolTip;
                    // determine a badge position among other badges
                float32 orientation;
        }
        class MapStatusColorBorder: MapClassDecoration {
                // Border id
                string id;
                string borderColor;
        }
        class MapStatusIndicator {
                string id;
                MapStatusQuery ref mapStatusQueryId;
                MapClassDecoration ref mapClassDecorationId;
                MapClassStatusToolTip ref mapStatusToolTipId;
                CMObjectClass   ref cmObjectClassId;
                string value;
        }
        class MapClassStatusQuery {
                MapStatusIndicator ref mapStatusIndicatorId;
                MapStatusQuery ref mapStatusQueryId;
                MapClassDecoration  ref  mapClassDecorationId;
        }
        class MapClassStatusToolTip {
                string id;
                string statusToolTip;
        }
```

The MapStatusQuery Types class defines types of queries that could be run for a particular map call. Each type corresponds to a badge for an object, e.g., Cluster has two types (packages and resources). Priority determines an order in which the badges (types) are processed. The MapStatusQuery class defines information needed to run a particular query. There are two types of queries: primary and secondary. A primary query determines a status of an object while a secondary query determines compound status (badge) for that object. For the secondary query, priority and type fields determine in which order and for which compound status this query will be run.

The MapClassDecoration class is an abstract class from which the MapBadgeIcon and MapStatusColorBorder classes are derived. The MapBadgeIcon class determines the properties of a badge. The MapStatusColorBorder class determines properties of an icon border, which for the exemplary embodiment includes color only. It will be apparent to one skilled in the art that other border properties could be used.

The MapStatusIndicator class provides a link between an outcome of query and the map decoration: a border or a badge. After a query is run, its result is compared to a value and if there is a match, a corresponding decoration will be displayed. The MapClassStatusQuery class provides a link between an outcome of query and the next step which could be either another query or a status indicator.

Figure 4:
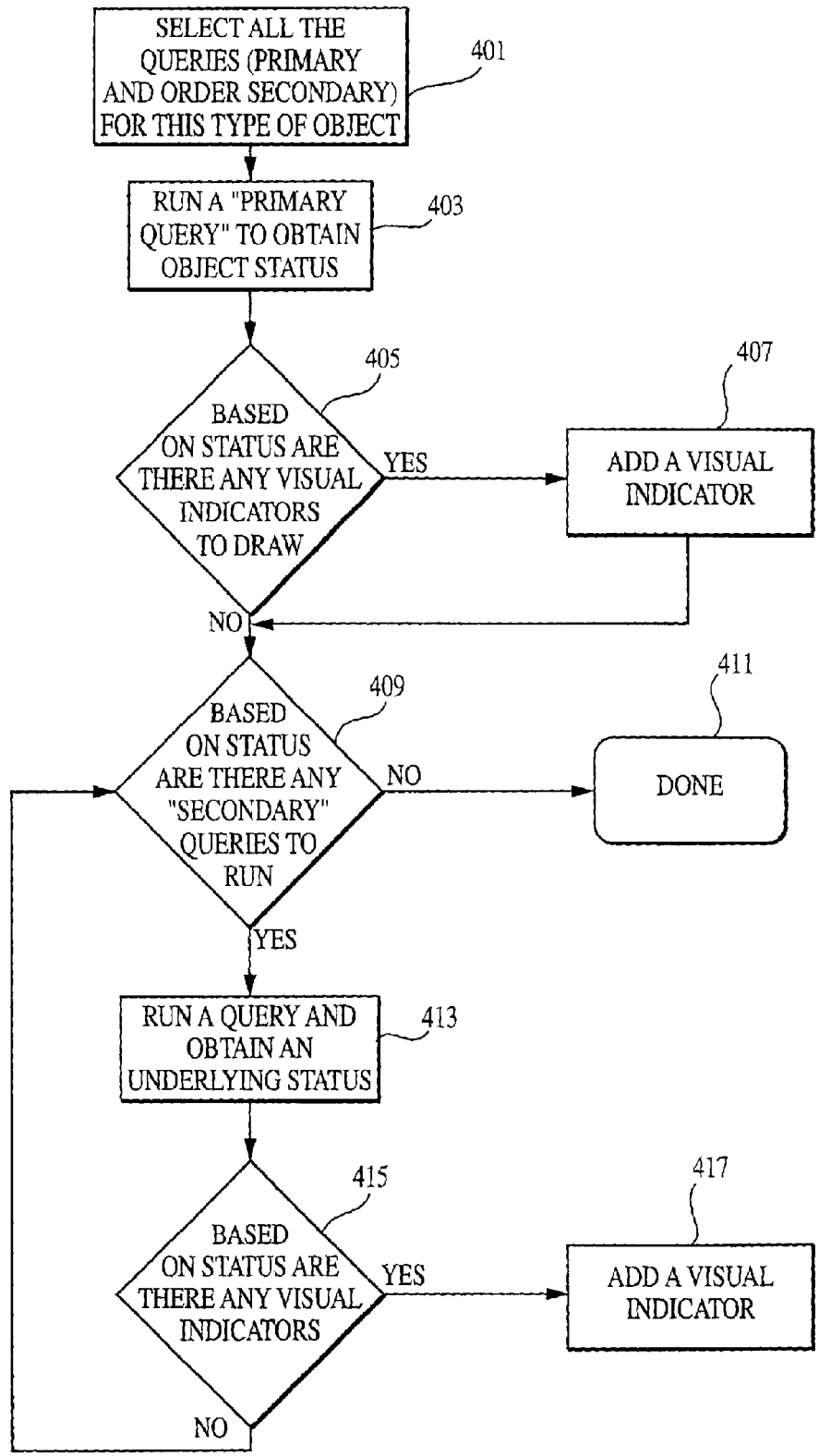
FIG. 4 is a flow diagram illustrating a method of the invention.

Referring now to FIG. 4, a flow chart of the query process is shown. Processing map object status for borders, tooltips and badges is performed as below. First, for each object, all queries are selected, both primary and secondary, for this type of object in block 401. A primary query is run to obtain the object status in block 403. A determination is made in block 405 as to whether there are visual indicators to draw, based on the status obtained in block 403. If so, a visual indicator is added in block 407. Regardless of the determination made in block 405, a determination is then made in block 409 as to whether there are secondary queries required, based on the status obtained in block 403. If not, then processing of this object is complete and overall display processing continues at block 411.

Otherwise, a secondary query is run in block 413 to obtain an underlying status. A determination is made in block 415 as to whether there are additional visual indicators to draw, based on the underlying status obtained in block 413. If so, a visual indicator is added in block 417. If not, processing returns to decision block 409 for a determination of whether there are additional secondary queries, and processing continues as described above.

In an exemplary embodiment, the MOF file might include the following instances (Copyright 2001 to Hewlett-Packard Company):

```
        instance of MapStatusQueryTypes {
                mapClassId = "CMObjectClass:SGCluster";
                type     = "icon";
                priority = 1;
        }
        instance of MapStatusQueryTypes {
                mapClassId = "CMObjectClass:SGCluster";
                type     = "packages";
                priority = 2;
        }
        instance of MapStatusQueryTypes {
                mapClassId = "CMObjectClass:SGCluster";
                type     = "resources";
                priority = 3;
        }
        instance of MapStatusQueryTypes {
                mapClassId = "CMObjectClass:SGCluster";
                type     = "nodes";
                priority = 4;
        }
        instance of MapStatusQueryTypes {
                mapClassId = "CMObjectClass:SGPackage";
                type     = "resources";
                priority = 1;
        }
        instance of MapStatusQueryTypes {
                mapClassId = "CMObjectClass:SGPackage";
                type     = "statusTooltips";
                priority = 2;
        }
        instance of MapStatusQueryTypes {
                mapClassId = "CMObjectClass:CMNode";
                type     = "quorumserver";
                priority = 1;
        }
        instance of MapStatusQueryTypes {
                mapClassId = "CMObjectClass:CMNode";
                type     = "nodeState";
                priority = 1;
        }
```

The code above instantiates a group of query types for clusters comprising: icon, packages, resources, and nodes. Query types of resources and status tooltips are instantiated for packages. Query types quorumserver and nodeState are instantiated for nodes. Instantiation of exemplary queries is shown below.

```
instance of MapStatusQuery {
    id = "MapStatusQuery:ClusterStatus";
    mapClassId = "CMObjectClass:SGCluster";
    query = "select status from SGCluster where id = $id";
    local = false;
    type = "primary";
    emptyValue = false;
}
instance of MapStatusQuery {
    id = "MapStatusQuery:ClusterDownNodesStatus";
    mapClassId = "CMObjectClass:SGCluster";
    query = "select * from Down NodesStatus";
    priority = 1;
    type = "nodes";
    local = true;
    emptyValue = false;
}
instance of MapStatusQuery {
    id = "MapStatusQuery:ClusterNodeQuorumServerStatus";
    mapClassId = "CMObjectClass:SGCluster";
    query = "SELECT DISTINCT CMNodeQuorumServerConnection.status
as status FROM SGCluster, QSQuorumServer, CMNode,
SGClusterQuorumServerConnection, CMNodeQuorumServerConnection,
SGClusterNodeContainment WHERE
SGClusterQuorumServerConnection.objectId1 = SGCluster.id and
SGClusterQuorumServerConnection.objectId2 = QSQuorumServer.id and
CMNodeQuorumServerConnection.objectId1 = CMNode.id and
CMNodeQuorumServerConnection.objectId2 = QSQuorumServer.id and
CMNodeQuorumServerConnection.status != \"up\" and
SGClusterNodeContainment.containeeId = CMNode.id and
SGClusterNodeContainment.containerId = $id and
SGClusterNodeContainment.status = \"up\"";
    priority = 2;
    type = "nodes";
    local = false;
    emptyValue = true;
    compatibilityRequirement="QuorumServerSupported";
}
```

As is understood to those skilled in the art, the users require changes in visual indicators or object properties that trigger visual indicators, the modifications are incorporated into the MOF file. This file is read upon launching the application GUI. No recompilation or re-coding is necessary, as is necessary in conventional techniques.

Having described preferred embodiments of a novel method that allows separation of graphical display of object status from underlying data (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A method for displaying visual indicators in a graphical user interface (GUI), comprising:

identifying modifiable parameters for visual indicators associated with a GUI;

constructing a class schema associating classes with the identified modifiable parameters;

defining primary queries associated with objects in the GUI;

defining secondary queries associated with objects in the GUI, the secondary queries having a priority which determines an order in which this query is run;

constructing a managed object format file with instances of the classes defined in the class schema, the instances corresponding to data maintained by an application using the graphical user interface.

2. The method as recited in claim 1, further comprising:

for each object in the display,
    selecting all queries corresponding to the object;
    running a primary query to obtain object status;
    determining whether the object status requires a visual indicator, and if so, displaying the required visual indicator;
    determining whether the object status requires one or more secondary queries, and if so, then
for each required secondary query,
    running a query to obtain an underlying status; and
    determining whether the underlying object status requires a visual indicator, and if so, displaying the required visual indicator.

3. The method as recited in claim 1, wherein the modifiable parameters for visual indicators identified in the identifying step are selected from a group of border colors, border pattern and associated icons.

4. The method as recited in claim 1, further comprising:

modifying the parameters for visual indicators, wherein the step of modifying comprises:

editing a managed object format file; and launching an application associated with the GUI.

5. The method as recited in claim 4, wherein launching an application further comprises:
reading the modified managed object format file; and
instantiating classes associated with the modified parameters.

6. A computer system for displaying visual indicators in a graphical user interface (GUI), comprising:
a computing device capable of executing object-oriented computer programs;
a module comprising a GUI running on the computing device;
a first section of object-oriented computer code defining a class schema, the schema comprising class definitions for a status query types and status queries for selected display objects, and relationships among the defined classes;
a second section of object-oriented computer code defining instances of classes for status query type classes and status query classes, wherein relationships between the GUI and display of desired visual indicators is modifiable in a text file.

7. The computer system as recited in claim 6, wherein the status query types class identifies a priority for a query type.

8. The computer system as recited in claim 7, wherein each status query class is associated with a status query type.

9. The computer system as recited in claim 6, wherein a status query type is a primary or secondary query, the primary queries determining a status of an object and a secondary query determining a compound status (or badge) for an object.

10. The computer system as recited in claim 9, wherein a secondary query has priority and type fields for determining an order for which compound status queries are to be run.

11. A method for dynamically modifying a visual indicator in a graphical user interface (GUI) without recompilation, said method comprising:
selecting desired visual indicators in a GUI;
modifying at least one parameter of the visual indicators, the modification being performed dynamically, wherein the dynamic modification enables display of the modified visual indicators upon re-launching of the GUI application without recompilation.

12. The method as recited in claim 11, further comprising:
re-launching the GUI application; and
displaying modified visual indicators.

13. The method as recited in claim 12, wherein re-launching the GUI application comprises:
exiting the GUI application; and
launching the GUI application, the GUI application reading a file having modified parameters for at least one visual indicator, the file being generated in the step of modifying at least one parameter of the visual indicators.

14. A memory for storing data for access by a graphical user interface (GUI) application program being executed on a data processing system, comprising:
an object-oriented data structure stored in the memory, the data structure including information related to a class schema, wherein the class schema comprises class definitions for status query types and status queries for selected display objects, and relationships among the defined classes and wherein the class schema identifies modifiable parameters for visual indicators associated with the GUI, the class schema being utilized in compilation of the GUI;
a plurality of primary queries stored in the memory, the primary queries being associated with objects in the GUI;
a plurality of secondary queries stored in the memory, the secondary queries being associated with objects in the GUI, and having a priority which determines an order in which a query is run; and
a plurality of instances of classes, the classes being defined in the class schema, wherein the class instances are stored in the memory and correspond to data maintained by an application using the graphical user interface,
wherein data in the memory are inputs to the GUI upon launching of the GUI application program, thereby avoiding recompilation of the GUI application program when the data in memory is modified.

15. A memory for storing data for access by a graphical user interface (GUI) application program being executed on a data processing system, comprising:
an object-oriented class schema stored in a first memory, wherein the class schema comprises class definitions for status query types and status queries for selected display objects, and relationships among the defined classes and wherein the class schema identifies modifiable parameters for visual indicators associated with the GUI, the class schema being utilized in compilation of the GUI; and
an object-oriented data structure stored in a second memory, the data structure comprising a plurality of class instances corresponding to classes defined in the class schema, a plurality of primary queries, the primary queries being associated with objects in the GUI, and a plurality of secondary queries associated with objects in the GUI, and having a priority which determines an order in which a query is run,
wherein data in the second memory are inputs to the GUI upon launching of the GUI application program, thereby avoiding recompilation of the GUI application program when data in the second memory is modified.

16. A method for displaying a layout of graphical user interface (GUI) properties panel, comprising:
selecting a display object, wherein the display object represents a focus object in memory, the focus object having a corresponding status in memory, relationships between the display object, the layout of the display object in the GUI and display object corresponding status being defined by a class schema, wherein the class schema comprises class definitions for status query types and status queries for selected display objects, and relationships among the defined classes and wherein the class schema identifies modifiable parameters for visual indicators associated with the GUI, the class schema being utilized in compilation of the GUI, and wherein instances of classes defined in the schema are defined in a modifiable text file, the modifiable text file being read by the GUI at application launch time; and
displaying the display object with visual indicators in a layout defined by the schema.

* * * * *